(12) United States Patent
Zha et al.

(10) Patent No.: US 7,223,340 B2
(45) Date of Patent: *May 29, 2007

(54) HOLLOW FIBRE RESTRAINING SYSTEM

(75) Inventors: Fufang Zha, West Ryde (AU); David John Cox, Penrith (AU)

(73) Assignee: U.S. Filter Wastewater Group, Inc., Warrendale, PA (US)

( * ) Notice: Subject to any disclaimer, the term of this patent is extended or adjusted under 35 U.S.C. 154(b) by 8 days.

This patent is subject to a terminal disclaimer.

(21) Appl. No.: 11/056,532

(22) Filed: Feb. 11, 2005

(65) Prior Publication Data

US 2005/0133438 A1    Jun. 23, 2005

Related U.S. Application Data

(63) Continuation of application No. 10/894,191, filed on Jul. 19, 2004, which is a continuation of application No. 10/268,600, filed on Oct. 9, 2002, now Pat. No. 6,783,008, which is a continuation of application No. PCT/AU01/00387, filed on Apr. 6, 2001.

(30) Foreign Application Priority Data

Apr. 10, 2000    (AU) .................................... PQ6801

(51) Int. Cl.
*B01D 63/02* (2006.01)
*B01D 27/08* (2006.01)
*B01D 29/11* (2006.01)

(52) U.S. Cl. ................. 210/321.88; 210/483; 210/485; 210/232

(58) Field of Classification Search ........ 210/483–486, 210/488, 495, 497.01, 497.1, 500.22, 321.88, 210/321.89, 232, 238
See application file for complete search history.

(56) References Cited

U.S. PATENT DOCUMENTS

| | | | | | |
|---|---|---|---|---|---|
| 3,804,258 | A | * | 4/1974 | Okuniewski et al. | ....... 210/460 |
| 4,642,182 | A | * | 2/1987 | Drori | ......................... 210/232 |
| 4,876,006 | A | * | 10/1989 | Ohkubo et al. | ........ 210/321.69 |
| 4,999,038 | A | * | 3/1991 | Lundberg | .................... 55/491 |
| 5,968,357 | A | * | 10/1999 | Doelle et al. | ............... 210/485 |

* cited by examiner

*Primary Examiner*—Krishnan S. Menon

(57) ABSTRACT

A restraining system for hollow fibers is provided. The restraining system includes a plurality of longitudinally extending elements spaced from one another and supported by a number of discrete spacer elements, each spacer element extending generally transverse of said longitudinal elements, such that in combination with said longitudinal elements they define a cage-like structure.

15 Claims, 6 Drawing Sheets

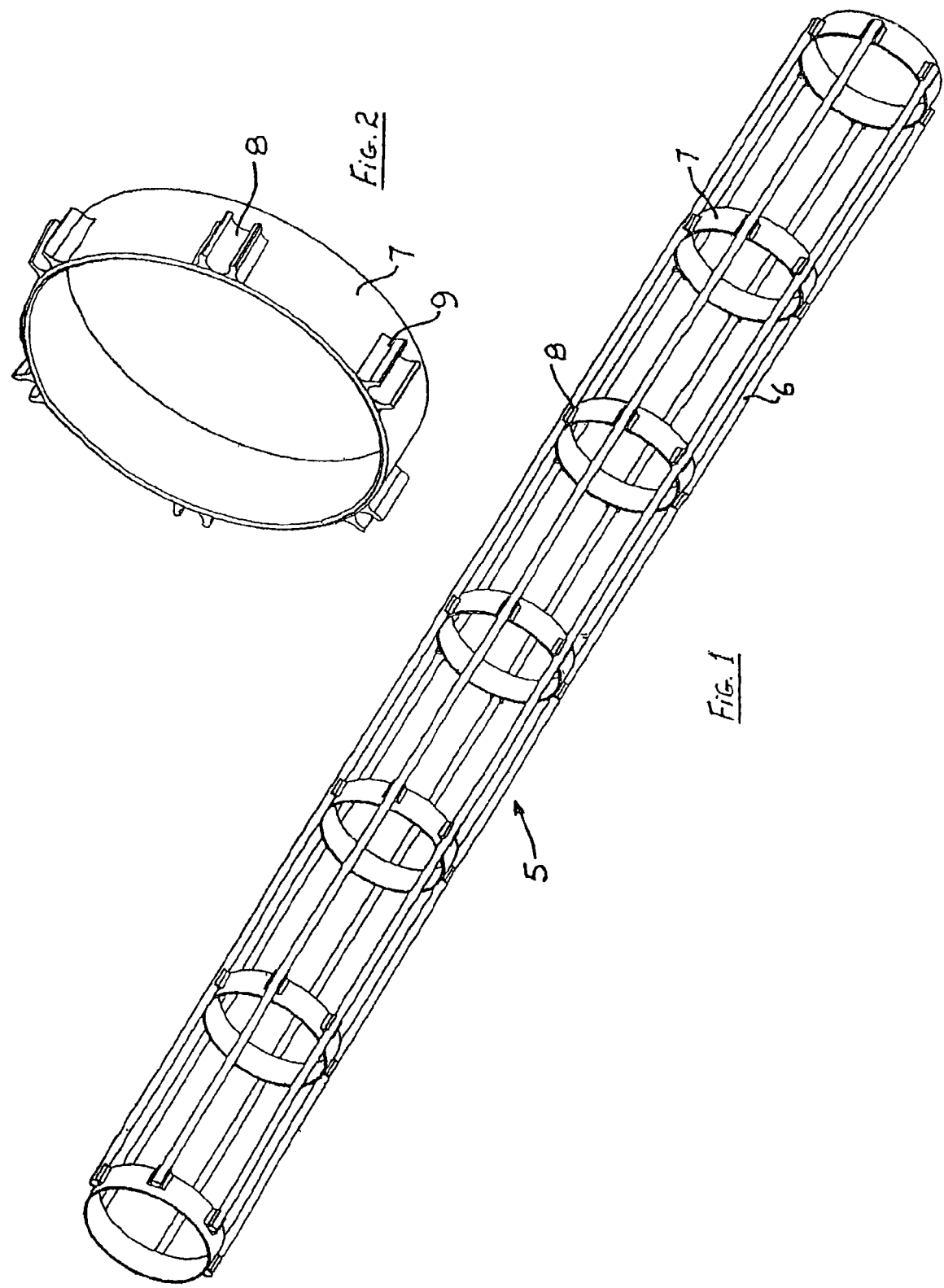

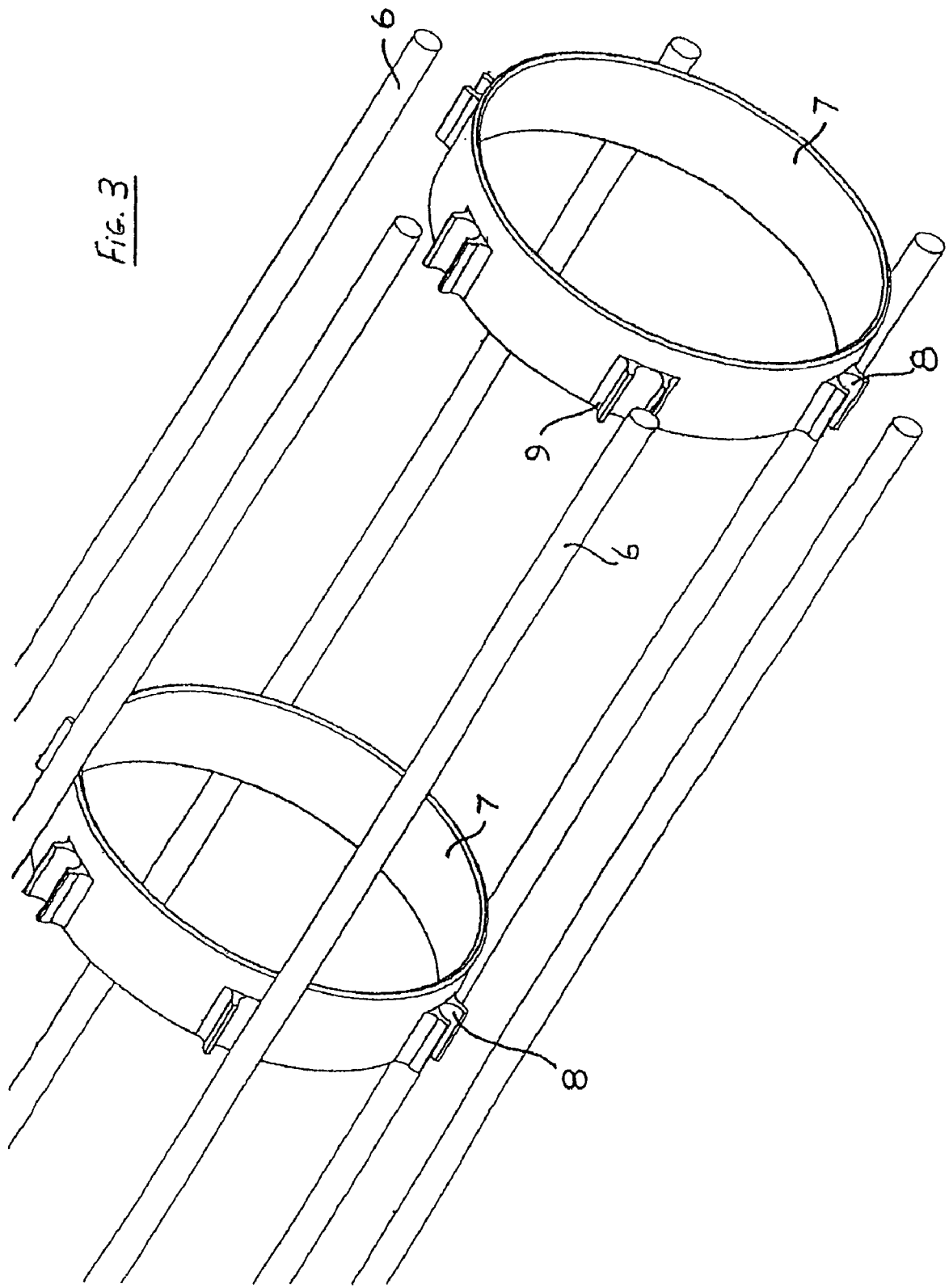

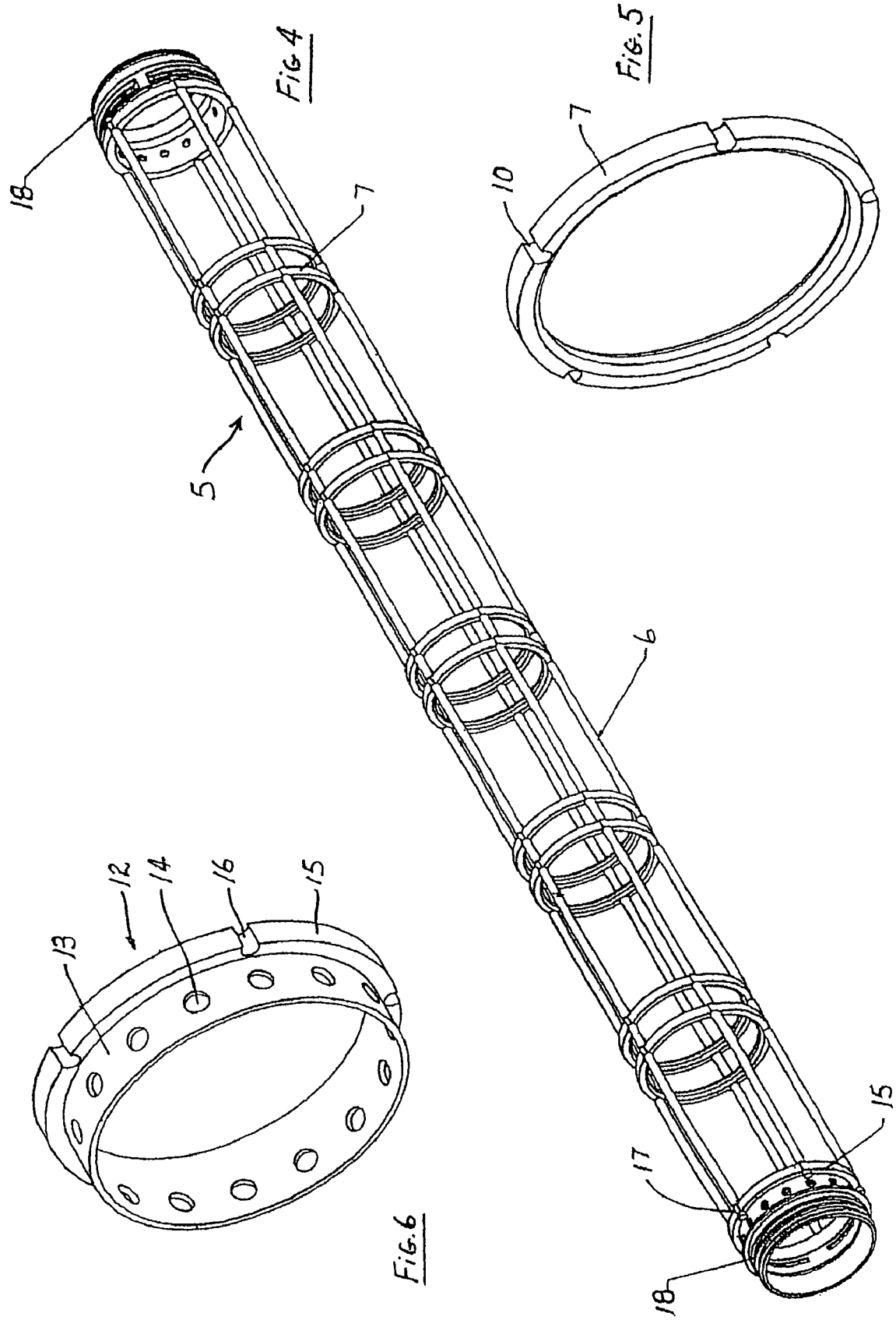

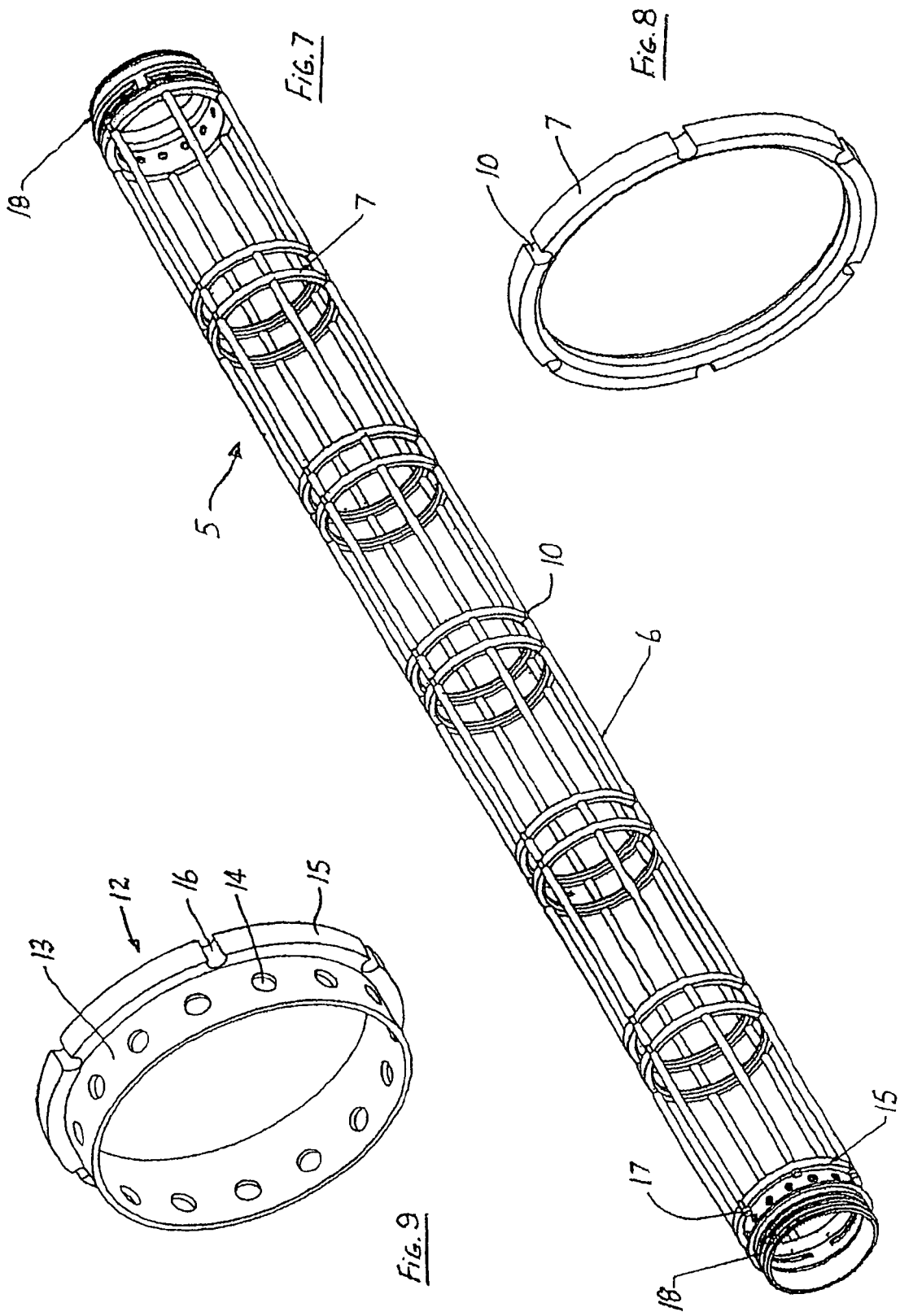

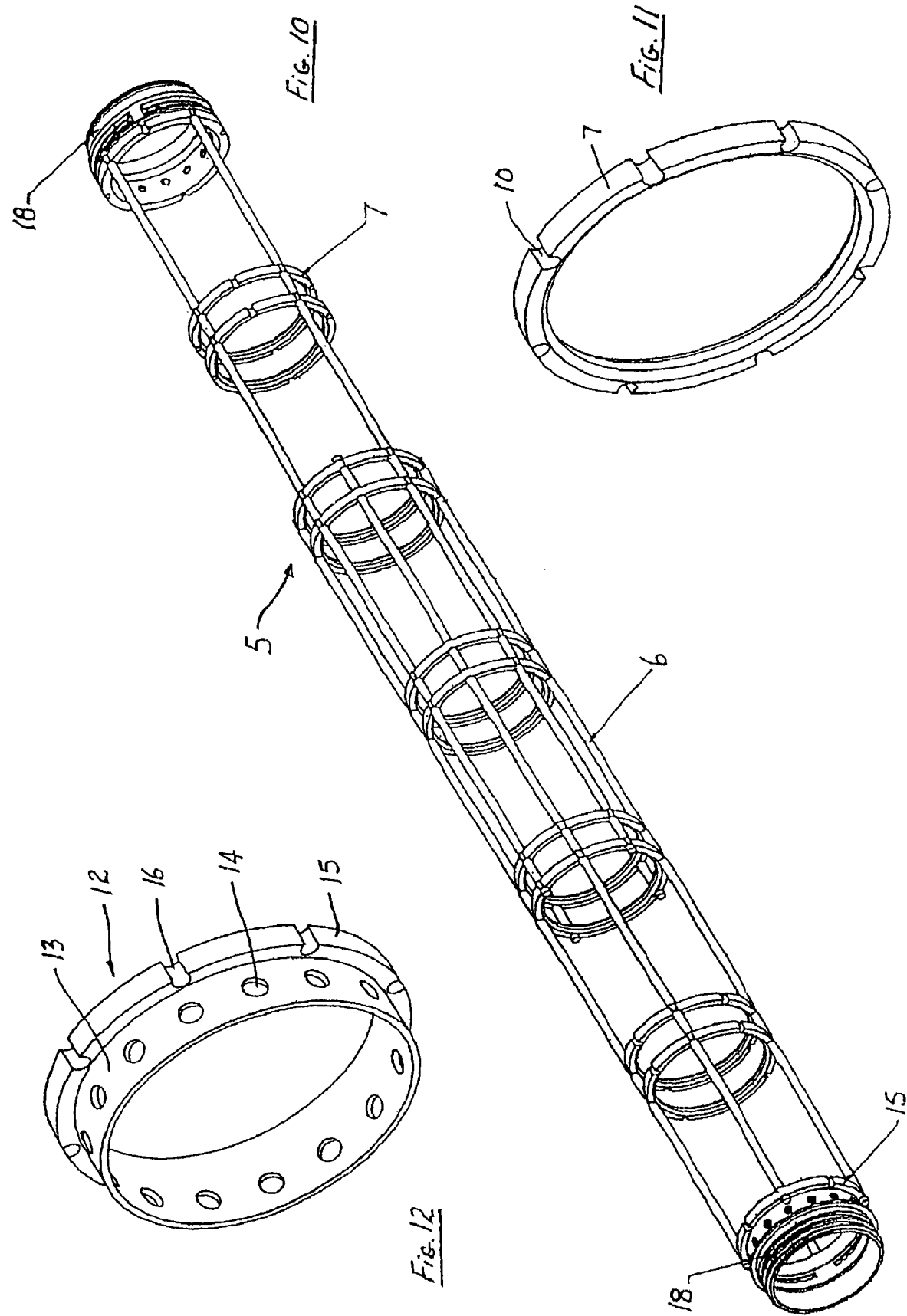

HOLLOW FIBRE RESTRAINING SYSTEM

RELATED APPLICATIONS

This application is a continuation of U.S. application Ser. No. 10/894,191, filed Jul. 19, 2004, which is a continuation of U.S. application Ser. No. 10/268,600, filed Oct. 9, 2002, now U.S. Pat. No. 6,783,008, which is a continuation, under 35 U.S.C. § 120, of International Patent Application No. PCT/AU01/00387, filed on Apr. 6, 2001, under the Patent Cooperation Treaty (PCT), which was published by the International Bureau in English on Oct. 18, 2001, which designates the United States, and which claims the benefit of Australian Provisional Patent Application No. PQ 6801, filed Apr. 10, 2000.

FIELD OF THE INVENTION

The present invention relates to a restraining system for hollow fibres used in membrane filtration systems.

BACKGROUND OF THE INVENTION

A number of different types of restraining systems usually in the form of a welded plastic mesh cage have been used in the past, however, these suffer from lack of rigidity when large apertures are required in the mesh to allow for fluid flows and are difficult to repair should any portion of the mesh be broken during transport, installation or use. While such known restraining systems are cheap and simple to manufacture they suffer from a lack of robustness in many required installations.

The present invention seeks to overcome or at least ameliorate one or more of the disadvantages of the prior art or at least provide the public with a useful alternative.

SUMMARY OF THE INVENTION

According to one aspect, the present invention provides a restraining system for hollow fibres including a plurality of longitudinally extending elements spaced from one another and supported by a number of discrete spacer elements, each spacer element extending generally transverse of said longitudinal elements such that in combination with said longitudinal elements they define a cage-like structure.

For preference, the cage-like structure is tubular. Preferably, the longitudinal elements are rods and the spacer elements are in the form of rings. It will be appreciated that the rings may of any geometric shape and are not limited to a circular shape. Similarly, the tubular structure and rods may be of any geometric cross sectional shape.

In one preferred form, each ring has a number of radially extending engagement formations for releasably engaging an associated rod. The formations may be in the form of part-circular opposed flanges spaced to provide a socket having an interference or snap-fit with the associated rod.

In another preferred form, each ring has a number of radially extending cut-outs spaced around its periphery, each cut-out being sized and shaped to form an interference or snap-fit with an associated rod. Preferably, the internal surface of each ring is bevelled along each internal edge. For further preference, the internal surface of each ring is providing with a cushioning element. Preferably, the cushioning element is formed of a foam material and extends past the length of each ring at both ends so as to overlap the internal edges of each ring.

The spacer elements may be formed from a number of sub-elements which are fixed together in use.

The cut-outs or sockets are preferably equally-spaced around the periphery of the ring.

For preference, the rods have a reduced diameter or width at the location where they engage with an associated spacer. Preferably, the reduced diameter is provided by a circumferential groove or slot.

The components of the system are preferably formed of generally rigid plastics material, typically nylon and acrylonitrile butadiene styrene (ABS). The components can be moulded or machined to the desired configuration. The cut-outs are preferably part circular in cross section with an opening slightly smaller than the diameter to provide for snap-fitting retention of the rods.

BRIEF DESCRIPTION OF THE DRAWINGS

Preferred embodiments of the invention will now be described, by way of example only, with reference to the accompanying drawings, in which:

FIG. 1 shows a perspective view of the restraining system according to one embodiment of the invention;

FIG. 2 shows a perspective view of the spacer component of the restraining system of FIG. 1;

FIG. 3 shows an enlarged exploded perspective view of the restraining system of FIG. 1;

FIG. 4 shows a perspective view of the restraining system according to a second embodiment of the invention;

FIG. 5 shows a perspective view of the snap ring component of the restraining system of FIG. 4;

FIG. 6 shows a perspective view of the adaptor ring component of the restraining system of FIG. 4;

FIG. 7 shows a perspective view of the restraining system according to a third embodiment;

FIG. 8 shows a perspective view of the snap ring component of the restraining system of FIG. 7;

FIG. 9 shows a perspective view of the adaptor ring component of the restraining system of FIG. 7;

FIG. 10 shows a perspective view of the restraining system according to a fourth embodiment;

FIG. 11 shows a perspective view of the snap ring component of the restraining system of FIG. 10;

FIG. 12 shows a perspective view of the adaptor ring component of the restraining system of FIG. 10.

DETAILED DESCRIPTION OF THE PREFERRED EMBODIMENT

Figure 13:
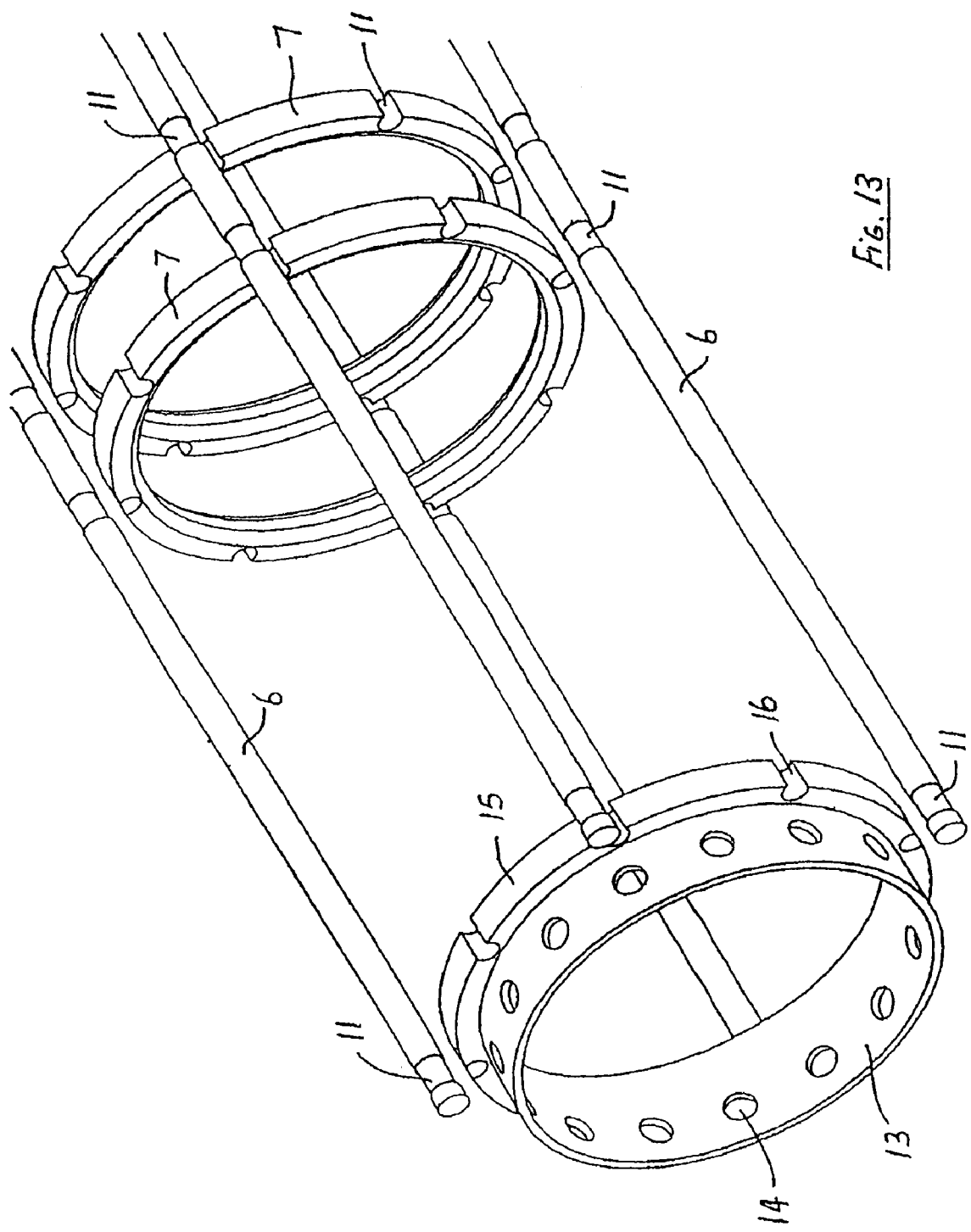
FIG. 13 shows an enlarged perspective view of the end of the restraining system of FIG. 4.

Referring to FIGS. 1 to 3, the restraining system comprises a generally tubular cage-like structure 5 formed from a plurality of longitudinally extending rods 6 spaced from one another and held in position by a number of longitudinally spaced and transversely extending spacer rings 7.

Each spacer ring 7 in this embodiment has a number of engagement sockets 8 spaced equally around its periphery. Each socket 8 is formed by part-circular opposed flanges 9 spaced to provide an interference or snap-fit with the associated rod 6. The sockets 8 are slightly over semi-circular in shape to provide retention of the rods 6.

Referring to FIGS. 4 to 13 of the drawings, each ring 7 in these embodiments has a number of radially extending cut-outs 10 equally spaced around its periphery, each cut-out 10 being sized and shaped to form an interference or snap-fit with an associated rod 6. The cut-outs 10 in this embodiment are slightly over semi-circular in shape to provide retention of the rods 6.

The rods 6 in this embodiment are provided with a circumferential groove or slot 11 to provide a reduced diameter/width at the location where they engage with the ring 7. This serves to prevent longitudinal movement of the rings 7 relative to the rods 6.

Each end of the tubular restraining structure 5 is provided with terminating adaptor ring 12 which, in use, mount the structure 5 to a potting sleeve 18 or the like. The adaptor ring 12 includes an inner ring 13 having a plurality of openings 14 to allow passage of fluid therethough and a radial extending circumferential rib 15. Rib 15 is again provided with a corresponding number of cut-outs 16 as those proved on spacer rings 7 for engaging the ends 17 of rods 6.

As shown in the various embodiments, the spacer rings 7 are preferably arranged in closely-spaced pairs. Further, the number of rods and rings can be varied according to restraint requirements. As best shown in FIG. 10, the density of rod numbers can also be varied along the length of the tubular structure 5 where restraint requirements vary along the length.

The restraining system is used to restrain a bundle of hollow fibre membranes employed in filtration systems. The fibre bundle extends longitudinally within the tubular restraining system. The restraining system allows fluid flow to and from the hollow fibre membranes. Typically, the fibres extend between upper and lower headers which, together with the restraining system, can be used to form a replaceable fibre bundle module. In such arrangements, the cage has the added advantage of protecting the fibre bundle during deployment of the module.

It will be appreciated, that further embodiments and exemplifications of the invention are possible without departing from the spirit or scope of the invention described.

What is claimed is:

1. A filtration system, said filtration system comprising:
   a bundle of hollow fibres, the bundle having an outer periphery; and
   a restraining system for the hollow fibres comprising:
      a plurality of discrete spacer elements positioned about the outer periphery of the bundle; and
      a plurality of longitudinally extending elements spaced from one another and supported by a plurality of discrete spacer elements, said spacer elements extending generally transverse of said longitudinally extending elements, wherein said spacer elements are constructed and arranged to be removably connected to said longitudinally extending elements to define a cage-like structure, and wherein each spacer element comprises a cushioning element, wherein the cushioning element is situated on the internal surface of the spacer elements.

2. A filtration system according to claim 1, wherein the cage-like structure comprises a tubular shape.

3. A filtration system according to claim 1, wherein the longitudinally extending elements comprise rods and the spacer elements comprise rings.

4. A filtration system according to claim 3, wherein each ring comprises a plurality of radially extending cut-outs spaced around a periphery of the ring, each cut-out configured to provide an interference-fit or snap-fit with an associated rod.

5. A filtration system according to claim 4, wherein the cut-outs are equally-spaced around the periphery of the ring.

6. A filtration system according to claim 1, wherein the cushioning element extends past a length of the ring at both ends of the ring so as to overlap the internal edges of the ring.

7. A filtration system according to claim 6, wherein the cushioning element comprises a foam material.

8. A filtration system according to claim 1, wherein at least one of the longitudinally extending elements and the spacer elements comprises a generally rigid plastic material.

9. A filtration system according to claim 8, wherein the generally rigid plastic material comprises nylon or acrylonitrile butadiene styrene.

10. A filtration system according to claim 1, wherein at least one of the longitudinally extending elements and the spacer elements is a molded element.

11. A filtration system according to claim 1, wherein at least one of the longitudinally extending elements and the spacer elements is a machined element.

12. A filtration system according to claim 1, wherein the restraining system comprises a terminating adaptor ring.

13. A filtration system according to claim 12, wherein the terminating adaptor ring is configured to mount the restraining system to a potting sleeve.

14. A filtration system according to claim 1, wherein the spacer elements are arranged in closely-spaced pairs.

15. A filtration system according to claim 1, wherein a number density of longitudinally extending elements varies along a length of the cage-like structure.

* * * * *